US011156258B2

(12) United States Patent
Marya et al.

(10) Patent No.: US 11,156,258 B2
(45) Date of Patent: Oct. 26, 2021

(54) REACTIVE SUPER-ELASTIC COMPOSITE OILFIELD COMPONENTS

(71) Applicant: SCHLUMBERGER TECHNOLOGY CORPORATION, Sugar Land, TX (US)

(72) Inventors: Manuel P. Marya, Rosharon, TX (US); Virendra Singh, Stafford, TX (US); Jushik Yun, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 460 days.

(21) Appl. No.: 15/724,242

(22) Filed: Oct. 3, 2017

(65) Prior Publication Data

US 2018/0094685 A1    Apr. 5, 2018

Related U.S. Application Data

(60) Provisional application No. 62/403,528, filed on Oct. 3, 2016.

(51) Int. Cl.
| | | |
|---|---|---|
| *F16F 1/02* | (2006.01) | |
| *C22C 9/00* | (2006.01) | |
| *C22C 38/02* | (2006.01) | |
| *C04B 35/486* | (2006.01) | |
| *C22C 19/03* | (2006.01) | |

(52) U.S. Cl.
CPC ............ *F16F 1/022* (2013.01); *C04B 35/486* (2013.01); *C22C 9/00* (2013.01); *C22C 19/03* (2013.01); *C22C 38/02* (2013.01); *F16F 2224/0258* (2013.01)

(58) Field of Classification Search
None
See application file for complete search history.

(56) References Cited

U.S. PATENT DOCUMENTS

| | | | |
|---|---|---|---|
| 6,763,899 B1 * | 7/2004 | Ossia | E21B 4/02 175/100 |
| 7,842,143 B2 | 11/2010 | Johnson et al. | |
| 2005/0202248 A1 * | 9/2005 | Browne | B60R 13/04 428/411.1 |
| 2010/0140439 A1 | 6/2010 | Schuh et al. | |
| 2016/0145961 A1 * | 5/2016 | Yu | B29C 44/1276 166/179 |
| 2016/0288200 A1 * | 10/2016 | Xu | C22C 49/14 |

FOREIGN PATENT DOCUMENTS

WO    WO-2014210283 A1 * 12/2014 ............. E21B 33/12

OTHER PUBLICATIONS

Chen, Y. et al., "Shape memory and superelasticity in polycrystalline Cu—Al—Ni microwires", Applied Physics Letters, 2009, 95(17), pp. 171906 (3 pages).
San Juan, J. et al. "Nanoscale shape-memory alloys for ultrahigh mechanical damping", Nature nanotechnology, 2009, 4, 5 pages.
Meng, H. et al., "A Brief Review of Stimulus-active Polymers Responsive to Thermal, Light, Magnetic, Electric, and Water/Solvent Stimuli", Journal of Intelligent Material Systems and Structures, 2010, 21, pp. 859-885.

* cited by examiner

*Primary Examiner* — Patricia L. Hailey
*Assistant Examiner* — Christopher D. Moody
(74) *Attorney, Agent, or Firm* — Kelly McKinney; Michael Dae

(57) ABSTRACT

An oilfield tool can include a composite structure that includes a reactive shape-memory alloy element disposed at least in part in a filler material.

16 Claims, 15 Drawing Sheets

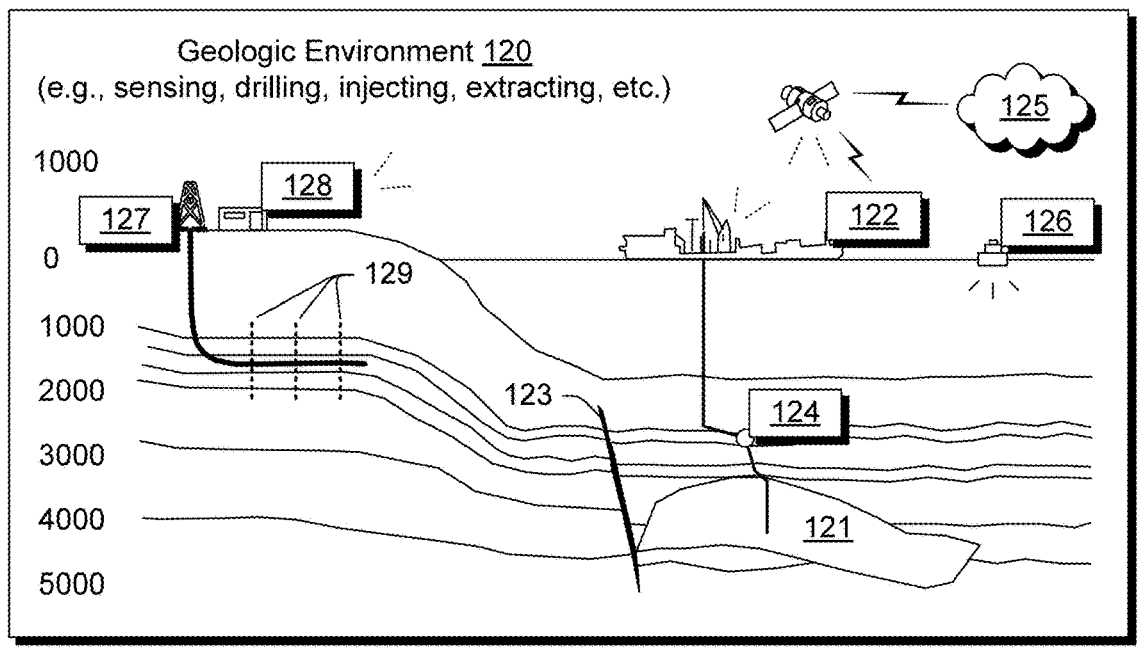
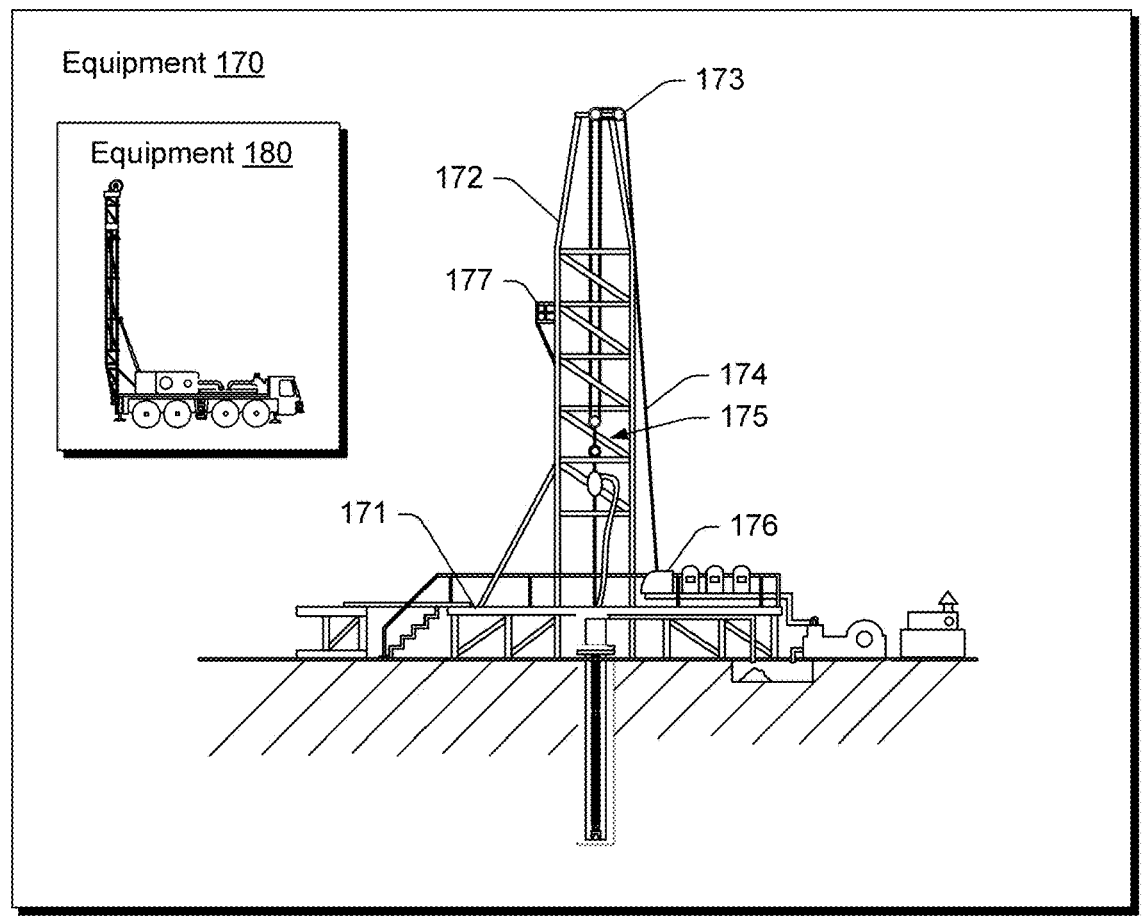
Fig. 1

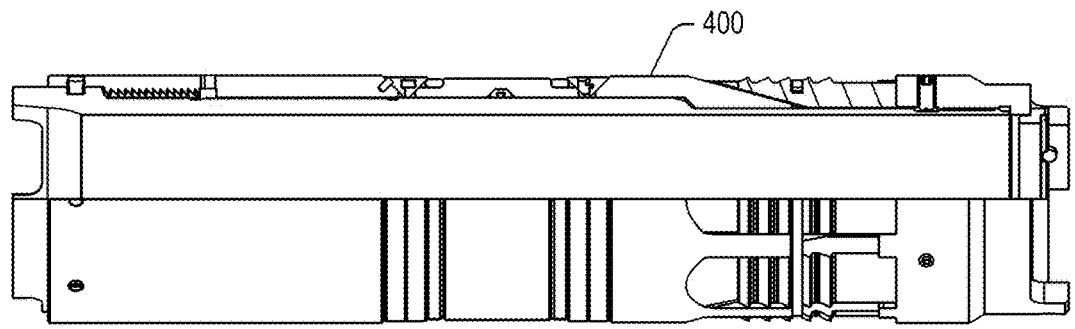
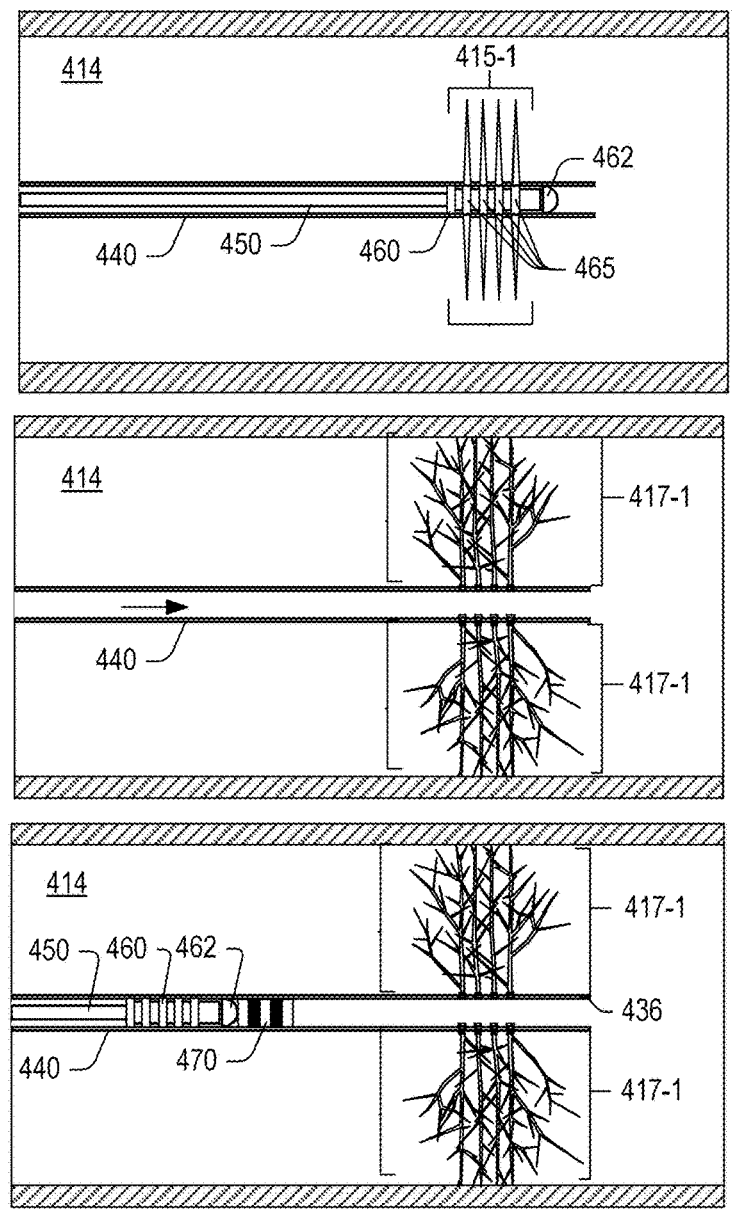
Fig. 4

| Alloy | Composition (atomic %) | Structure Change or Crystal structure of Martensite |
|---|---|---|
| Ag—Cd | 44-49 Cd | B2-2H |
| Au—Cd | 46.5-48.0 Cd | B2-2H |
| Au—Cd | 49-50 Cd | B2-trigonal |
| Cu—Zn | 38.5-41.5 Zn | B2-M (modified) 9R |
| Cu—Zn—X X = Si, Sn, Al, Ga | A few at % | B2-M9R |
| Cu—Al—Ni | 28-29 Al, 3.0-4.5 Ni | DO$_3$-2H |
| Cu—Al—Mn | 16-18 Al, 9-13 Mn | L2$_1$-18R |
| Cu—Au—Zn | 23-28 Au, 45-47 Zn | Heusler-18R |
| Cu—Al—Be | 22-25 Al, 0.5-8 Be | B2-DO$_3$ |
| Ni—Al | 36-38 Al | B2-3R, 7R |
| Ti—Ni | 49-51 Ni | B2 Monoclinic B2-R-phase (monoclinic) |
| Ti—Ni—Cu | 8-20 Cu | B2-orthorombic (monoclinic) |
| Ti—Pd—Ni | 0-40 Ni | B2-orthorhombic (monoclinic) |
| In—Tl | 18-23 Tl | FCC-FCT |
| In—Cd | 4-5 Cd | FCC-FCT |
| Mn—Cd | 5-35-Cd | FCC-FCT |
| Fe—Pt | 25 Pt | BCC or BCT |
| Fe—Ni—Co—Ti | 23 Ni, 10 Co, 10 Ti | BCC or BCT |
| Fe—Ni—Co—Ti | 33 Ni, 10 Co, 4 Ti | BCC or BCT |
| Fe—Ni—Co—Ti | 31 Ni, 10 Co, 3 Ti | BCC or BCT |
| Fe—Ni—C | 31 Ni, .4 C | BCC or BCT |
| Fe—Ni—Nb | 31 Ni, 7 Nb | BCC or BCT |
| Fe—Mn—Si | 30 Mn, 1 Si (single crystal) 28-33 Mn, 4-6 Si | HCP |
| Fe—Cr—Ni—Mn—Si | 9 Cr, 5 Ni, 14 Mn, 6 Si | HCP |
| Fe—Cr—Ni—Mn—Si | 13 Cr, 6 Ni, 8 Mn, 6 Si | HCP |
| Fe—Cr—Ni—Mn—Si | 8 Cr, 5 Ni, 20 Mn, 5 Si | HCP |
| Fe—Cr—Ni—Mn—Si | 12 Cr, 5 Ni, 16 Mn, 5 Si | HCP |
| Fe—Mn—Si—C | 17 Mn, 6 Si, 0.3 C | HCP |
| Fe—Pd | 30 Pd | FCT |
| Fe—Pt | 25 Pt | FCT |

Fig. 7

REACTIVE SUPER-ELASTIC COMPOSITE OILFIELD COMPONENTS

CROSS-REFERENCE TO RELATED APPLICATIONS

This application claims priority to and the benefit of U.S. provisional application having Ser. No. 62/403,528, filed Oct. 3, 2016 and titled REACTIVE SUPER-ELASTIC COMPOSITE OILFIELD COMPONENTS, which is incorporated by reference herein.

BACKGROUND

Various types of materials are used in equipment, operations, etc. for exploration, development and production of resources from geologic environments. For example, equipment may be used in one or more of a sensing operation, a drilling operation, a cementing operation, a fracturing operation, a production operation, etc.

SUMMARY

An oilfield tool can include a composite structure that includes a reactive shape-memory alloy element disposed at least in part in a filler material. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 4 illustrates an example of an assembly and example processes associated with a stimulation operation;

FIG. 7 illustrates a table of examples of alloys;

DETAILED DESCRIPTION

Figure 2:
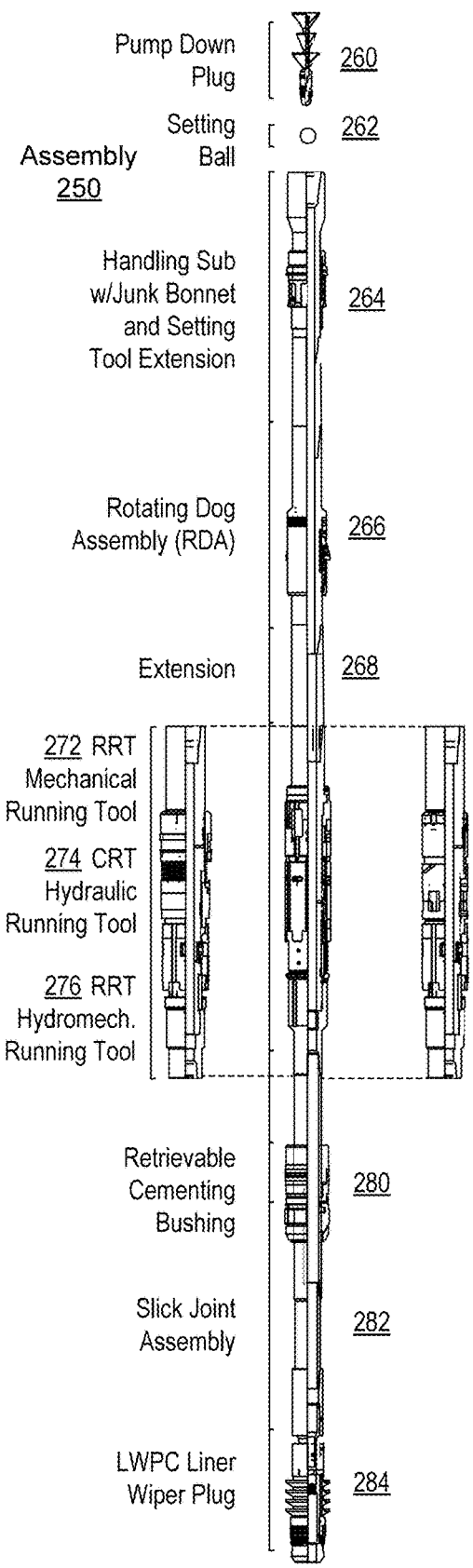
FIG. 2 illustrates examples of equipment of an example of an assembly.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

As an example, a crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable.

As an example, a drillstring can be suspended within a borehole and have a drillstring assembly that includes a drill bit at its lower end. As an example, a drillstring assembly may be a bottom hole assembly (BHA). A drillstring (e.g., including one or more downhole tools) may be composed of a series of pipes threadably connected together to form a long tube with a drill bit at the lower end thereof. As a drillstring is advanced into a bore for drilling, at some point in time prior to or coincident with drilling, the mud may be pumped where the mud can then flow via a passage (e.g., or passages) in the drillstring and out of ports located on the drill bit. As the mud exits the drillstring via ports in the drill bit, it can then circulate upwardly through an annular region between an outer surface(s) of the drillstring and surrounding wall(s) (e.g., open borehole, casing, etc.). In such a manner, the mud lubricates the drill bit and carries heat energy (e.g., frictional or other energy) and formation cuttings to the surface where the mud (e.g., and cuttings) may be returned to a mud tank, for example, for recirculation (e.g., with processing to remove cuttings, etc.).

As an example, mud-pulse telemetry equipment may include a downhole device configured to effect changes in pressure in the mud to create an acoustic wave or waves upon which information may modulated. In such an example, information from downhole equipment may be transmitted uphole to an uphole device, which may relay such information to other equipment for processing, control, etc.

As an example, a drillstring may be fitted with telemetry equipment that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

A drillstring may include one or more of logging-while-drilling (LWD) module, a measuring-while-drilling (MWD) module, a roto-steerable system and motor, and a drill bit.

A LWD module may be housed in a suitable type of drill collar and can contain one or a plurality of selected types of logging tools. A MWD module may be housed in a suitable type of drill collar and can contain one or more devices for measuring characteristics associated with drilling. As an example, a MWD module may include one or more of the following types of measuring devices: a weight-on-bit measuring device, a torque measuring device, a vibration measuring device, a shock measuring device, a stick slip measuring device, a direction measuring device, and an inclination measuring device.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

FIG. 2 shows an example of an assembly 250 that can include a pump down plug 260, a setting ball 262, a handling sub with a junk bonnet and setting tool extension 264, a rotating dog assembly (RDA) 266, an extension(s) 268, a mechanical running tool 272, a hydraulic running tool 274, a hydromechanical running tool 276, a retrievable cementing bushing 280, a slick joint assembly 282 and/or a liner wiper plug 284.

As an example, a plug may be an object that can be seated, for example, to seal an opening. As an example, the pump down plug 260 and the setting ball 262 may be plugs. As an example, a plug tool may be a tool that includes at least one seat to seat a plug. For example, a plug tool may include a seat that can seat a plug shaped as a ball (e.g., a spherical plug), as a cylinder (e.g., a cylindrical plug), or other shaped plug.

As an example, an assembly may include a liner top packer with a polished bore receptacle (PBR), a coupling(s), a mechanical liner hanger, a hydraulic liner hanger, a hydraulic liner hanger, a liner(s), a landing collar with a ball seat, a landing collar without a ball seat, a float collar, a liner joint or joints and/or a float shoe and/or a reamer float shoe.

As an example, a method can include a liner hanger setting procedure. Such a procedure may include positioning a liner shoe at a depth at which a hanger is to be set, dropping a setting ball from a ball dropping sub of a cementing manifold, gravitating or pumping the ball down to a ball catch landing collar, reducing the pump rate when the ball is expected to seat, increasing pressure, which pressure may act through setting ports of a hanger body and set slips on to a casing, and while holding the hanger setting pressure, setting the liner hanger by slacking off the liner weight on the hanger slips, where a loss of weight may be indicated on a weight gauge as the liner hanger sets.

In the foregoing example, it may be desirable that the ball (see, e.g., the ball 262) has properties suited for one or more operation or operations. Properties may include mechanical properties and may include one or more other types of properties (e.g., chemical, electrical, etc.). As an example, it may be desirable that the ball degrades. For example, a ball may be manufactured with properties such that the ball degrades when exposed to one or more conditions (e.g., consider environmentally-assisted cracking). In such an example, where the ball acts to block a passage, upon degradation, the passage may become unblocked. As an example, a ball or other component (e.g., a plug, etc.) may degrade in a manner that facilitates one or more operations.

Figure 3:
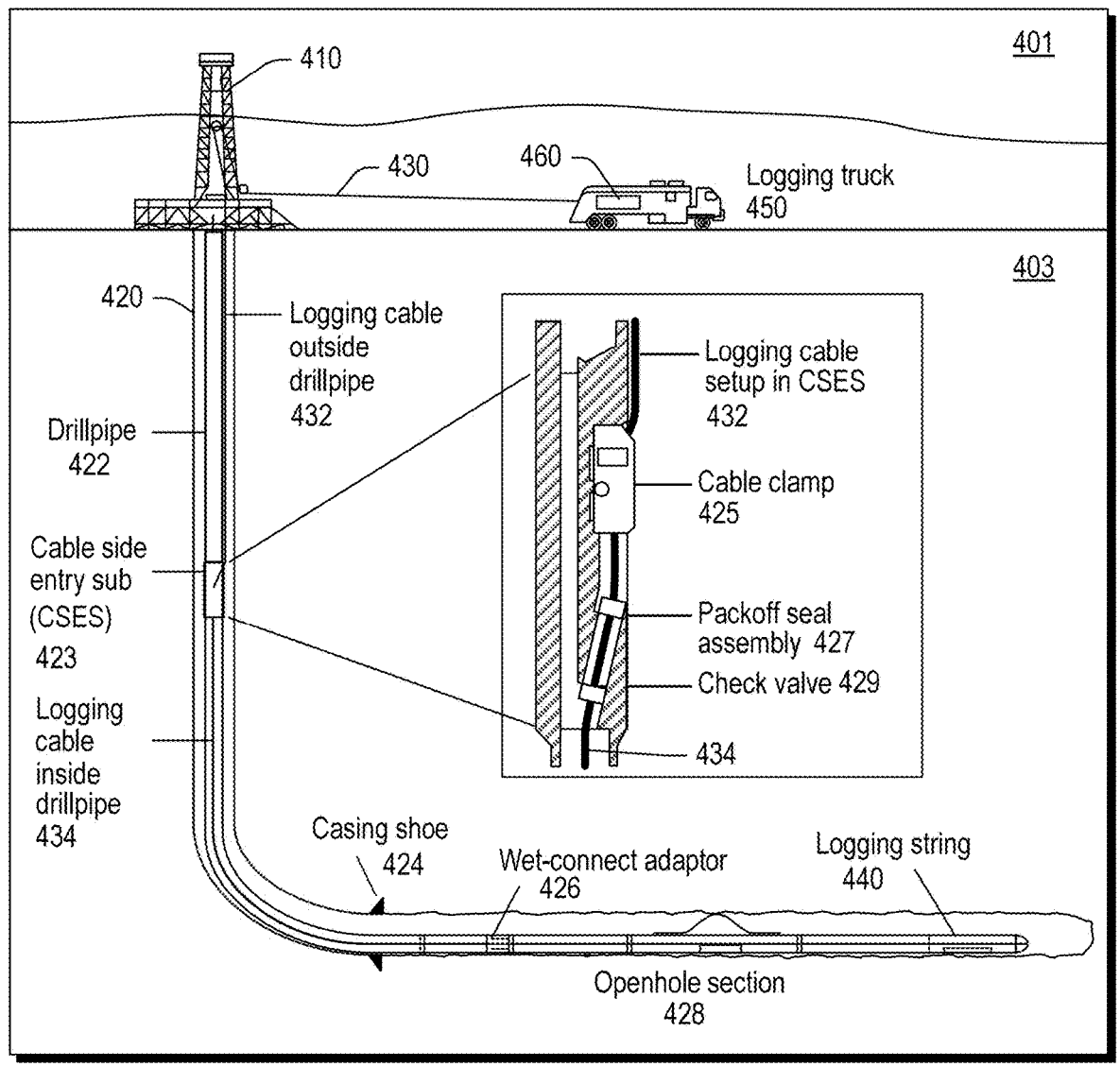
FIG. 3 illustrates an example of an environment that includes various examples of equipment.

FIG. 3 shows an example of an environment 301 that includes a subterranean portion 303 where a rig 310 is positioned at a surface location above a bore 320. In the example of FIG. 3, various wirelines services equipment can be operated to perform one or more wirelines services including, for example, acquisition of data from one or more positions within the bore 320.

In the example of FIG. 3, the bore 320 includes drillpipe 322, a casing shoe, a cable side entry sub (CSES) 323, a wet-connector adaptor 326 and an openhole section 328. As an example, the bore 320 can be a vertical bore or a deviated bore where one or more portions of the bore may be vertical and one or more portions of the bore may be deviated, including substantially horizontal.

In the example of FIG. 3, the CSES 323 includes a cable clamp 325, a packoff seal assembly 327 and a check valve 329. These components can provide for insertion of a logging cable 330 that includes a portion 332 that runs outside the drillpipe 322 to be inserted into the drillpipe 322 such that at least a portion 334 of the logging cable runs inside the drillpipe 322. In the example of FIG. 3, the logging cable 330 runs past the wet-connect adaptor 326 and into the openhole section 328 to a logging string 340.

As shown in the example of FIG. 3, a logging truck 350 (e.g., a wirelines services vehicle) can deploy the wireline 330 under control of a system 360. The system 360 may control one or more aspects of equipment of the logging string 340 and/or the logging truck 350.

FIG. 4 shows an example of a flow through fracturing plug assembly 400. The fracturing plug assembly 400 can include a fracturing ball that can be degradable. The fracturing plug assembly 400 can be utilized to isolate a zone or zones during stimulation (e.g., hydraulic fracturing). As an example, the fracturing plug assembly 400 can include an antipreset ring. As an example, the fracturing plug assembly 400 can be of a length of the order of hundreds of millimeters (e.g., 200 mm to about 800 mm) and can be of an outer diameter of about 50 mm to about 400 mm with an inner diameter of about 25 mm to about 350 mm. Such an assembly may be pressure rated (e.g., 10,000 psi or about 70 kPa).

FIG. 4 also shows an example of a formation that includes a layer 414 where a bore may be at least partially cased with casing 440 into which a string or line 450 may be introduced that carries a perforator 460. As shown, the perforator 460 can include a distal end 462 and charge positions 465 associated with activatable charges that can perforate the casing 440 and form channels 415-1 in the layer 414. Next, fluid may be introduced into the bore where the fluid passes through the perforations in the casing 440 and into the channels 415-1. Where such fluid is under pressure, the pressure may be sufficient to fracture the layer 414, for example, to form fractures 417-1, which may be first stage fractures, for example, of a multistage fracturing operation.

As an example, additional operations may be performed for further fracturing of the layer 414. For example, a fracturing plug assembly 470 may be introduced into the bore 430 between a heel and a toe and positioned, for example, in a region between first stage perforations of the casing 440 and the heel. The perforator 460 may be activated to form additional perforations in the casing 440 (e.g., second stage perforations) as well as channels in the layer 414 (e.g., second stage channels). Fluid may be introduced while the fracturing plug assembly 470 is disposed in the bore 430, for example, to isolate a portion of the bore 430 such that fluid pressure may build to a level sufficient to form additional fractures in the layer 414 (e.g., second stage fractures).

It may be desirable that a plug assembly (e.g., the fracturing plug assembly 470) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades (e.g., a degradable ball), that a plug seat degrades, that at least a portion of a fracturing plug assembly degrades, etc. For example, a plug may be manufactured with properties such that the plug withstands, for a period of time, conditions associated with an operation and then degrades (e.g., when exposed to one or more conditions). In such an example, where the fracturing plug assembly acts to block a passage for an operation, upon degradation, the passage may become unblocked, which may allow for one or more subsequent operations.

As an example, a component may be degradable upon contact with a fluid such as an aqueous ionic fluid (e.g., saline fluid, etc.). As an example, a component may be degradable upon contact with well fluid that includes water (e.g., consider well fluid that includes oil and water, etc.). As an example, a component may be degradable upon contact with a fracturing fluid (e.g., a hydraulic fracturing fluid).

One or more components, assemblies, etc. suitable for downhole operations may be include a reactive elastic material that may be augmented for flexing and shock damping. As an example, such a material may be a reactive super-elastic composite material augmented for flexing and shock damping and suitable for one or more production CLG/ATG flow devices, FE sampling, and DLG assisted steering, etc.

A component may include a reactive/intelligent composite material that includes a super-elastic material.

As an example, a 3D-thick composite layout can utilize in main proportion superplastic rods (e.g., with so-called bamboo structure) combined with one or more other materials to create actively-controllable (e.g., "intelligent") 3D parts with super-elastic flexing, with side benefits like extreme shock damping and reversible shape-memory behaviors.

As an example, super-elastic rods can be aligned to form groups with single directionality within reactive filler that includes partially-to-fully reversible deformable materials. As an example, a filler can be a smart material reacting to the flexing of the 3D rod layout and may include one or more of thermal, electrical, magnetic, pH-sensitive shape-memory polymers and/or, for example, one or more ductile materials such as polymers imbedded with smart fillers and ductile metals. Examples of active fillers can include: (1) self-healing chemicals (e.g., over-flexing breaks, release a chemical, fill and glue cracks or fixes leakage paths; preferably for filler with limited ductility), (2) piezo-particles (e.g., generate small currents within an electrically sensitive filler, itself for instance changing a polymer stiffness due to coulombic charges, or charges like a capacitance as needed by application), (3) thermal-active shape memory polymers (e.g., the flexing induces internal friction and/or Joule heating by internal current which itself triggers shape-changes), (4) pH-active shape-memory polymers (e.g., in the presence of water for instance; e.g. hydrogels, the polymer controls its swelling and therefore provide reactive sealing in between super-elastic rods), (5) ferromagnetic particles (e.g., responding to an external magnetic field), among one or more others.

As an example, one or more components or assemblies can be or include mechanical springs with enhanced displacement for sleeve actuation, check darts in gas-lift/chemical injection valves, hinges for flapper valves, valve flappers, super-elastic packer blades for enhanced sealing (e.g. wireline packer), super-elastic membranes for fluid displacement (including electromagnetically actuated, for example, with use of ferromagnetic material), tubular components for enhanced shock-absorption and bending for smaller drill/coring bit turning angle, among other applications.

A US published patent application (US 20100140439 A1) is incorporated by reference herein, which is entitled "Super elastic alloy structural geometry for ultrahigh mechanical damping".

As an example, a class of super-elastic alloy structures can include geometric structural feature dimensions and alloy characteristics that can reversibly dissipate mechanical energy with mechanical damping properties. As an example, a super-elastic alloy structure can act to suppress mechanical vibration and impact shocks.

As an example, super-elastic alloys can exhibit reversible phase transformations and can include shape memory alloys such as, for example, copper-based alloys, like Cu—Al—Ni alloys, as well as a wide range of one or more other super-elastic alloys. A super-elastic alloy can dissipate mechanical energy through reversible thermoelastic martensitic transformation, for example, between a high temperature phase (e.g., austenite) and a low temperature phase (martensite). Transformations between these two phases may occur via shearing of an atomic lattice to produce a corresponding structural shape change.

An austenite-martensite phase transformation can be induced by application of mechanical stress to an alloy structure, which may occur at a relatively constant temperature. Such mechanical stress-induced phase transformation can provide for dissipating energy in a super-elastic alloy structure.

An article by Chen et al., Shape memory and superelasticity in polycrystalline Cu—Al—Ni microwires, Applied Physics Letters 95, 171906 (2009), is incorporated by reference herein.

As an example, a material can be an environmentally reactive material with flexing enabled by an array of oriented rods (e.g., or fibers) having super-elastic properties (therefore by themselves exhibiting shape-memory behavior).

As an example, a component can include a material that is a shape memory material, which may be characterized by a phase or phases. For example, various shape memory materials can exist in two different phases, with three different crystal structures (e.g., twinned martensite, detwinned martensite and austenite) and six possible transformations.

As an example, a shape memory material can exhibit different shape memory effects. For example, consider one-way and two-way shape memory effects. As an example, a shape memory material may exhibit superelasticity, which can be characterized by recovery of unusually large strains. As an example, consider a shape memory material that, instead of transforming between the martensite and austenite phases in response to temperature, the phase transformation is induced in response to mechanical stress. As an example, when such a shape memory material is loaded in the austenite phase, the material may transform to the martensite phase above a critical stress, for example, proportional to the transformation temperatures. In such an example, upon continued loading, the twinned martensite may begin to detwin, allowing the material to undergo large deformations. In such an example, once the stress is released, the martensite may transform back to austenite such that the material recovers its "original" shape. As an example, such materials may reversibly deform to very high strains (e.g., up to 8 percent or more).

Figure 5:
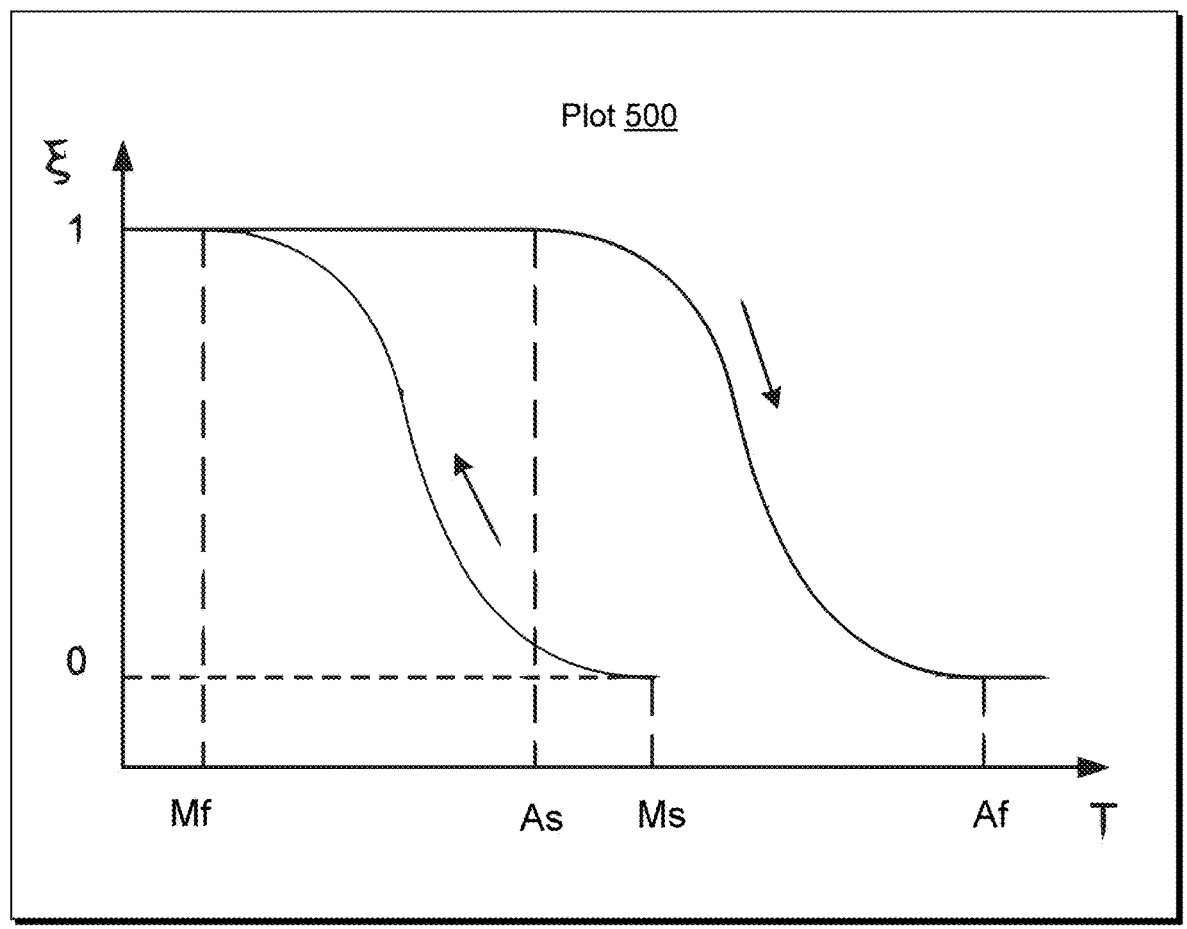
FIG. 5 illustrates an example of a plot of a shape-memory material.

FIG. 5 shows an example of a plot 500 for NiTi-based shape memory material that can change from austenite to martensite upon cooling. In the plot 500, Mf is the temperature at which the transition to martensite completes upon cooling. As indicated in the plot 500, during heating, As and Af are the temperatures at which the transformation from martensite to austenite starts and finishes. Repeated use of the shape-memory effect may lead to a shift of the characteristic transformation temperatures (e.g., an effect known as functional fatigue, as may be related with a change of microstructural and functional properties of the material). The maximum temperature at which a shape memory alloy can no longer be stress induced is called Md. In some instances, shape memory alloy may be considered to be permanently deformed when it can no longer be stress induced.

As illustrated in the plot 500 of FIG. 5, the transition from the martensite phase to the austenite phase depends on temperature and, it can also depend on stress. The austenite structure receives its name from steel alloys of a similar structure. A reversible diffusionless transition between these two phases can result in particular shape memory properties. While martensite can be formed from austenite by rapidly cooling carbon-steel, as this process is not reversible, steel does not tend to possess shape-memory properties.

Referring again to the plot 500 of FIG. 5, $\xi(T)$ represents the martensite fraction of a shape memory material (e.g., a NiTi-based shape memory alloy). As indicated in the plot 500, a difference between the heating transition and the cooling transition gives rise to hysteresis where some of the mechanical energy is lost in the process. The shape of the curve depends on the material properties of the shape memory material (e.g., consider alloying and work hardening).

Figure 6:
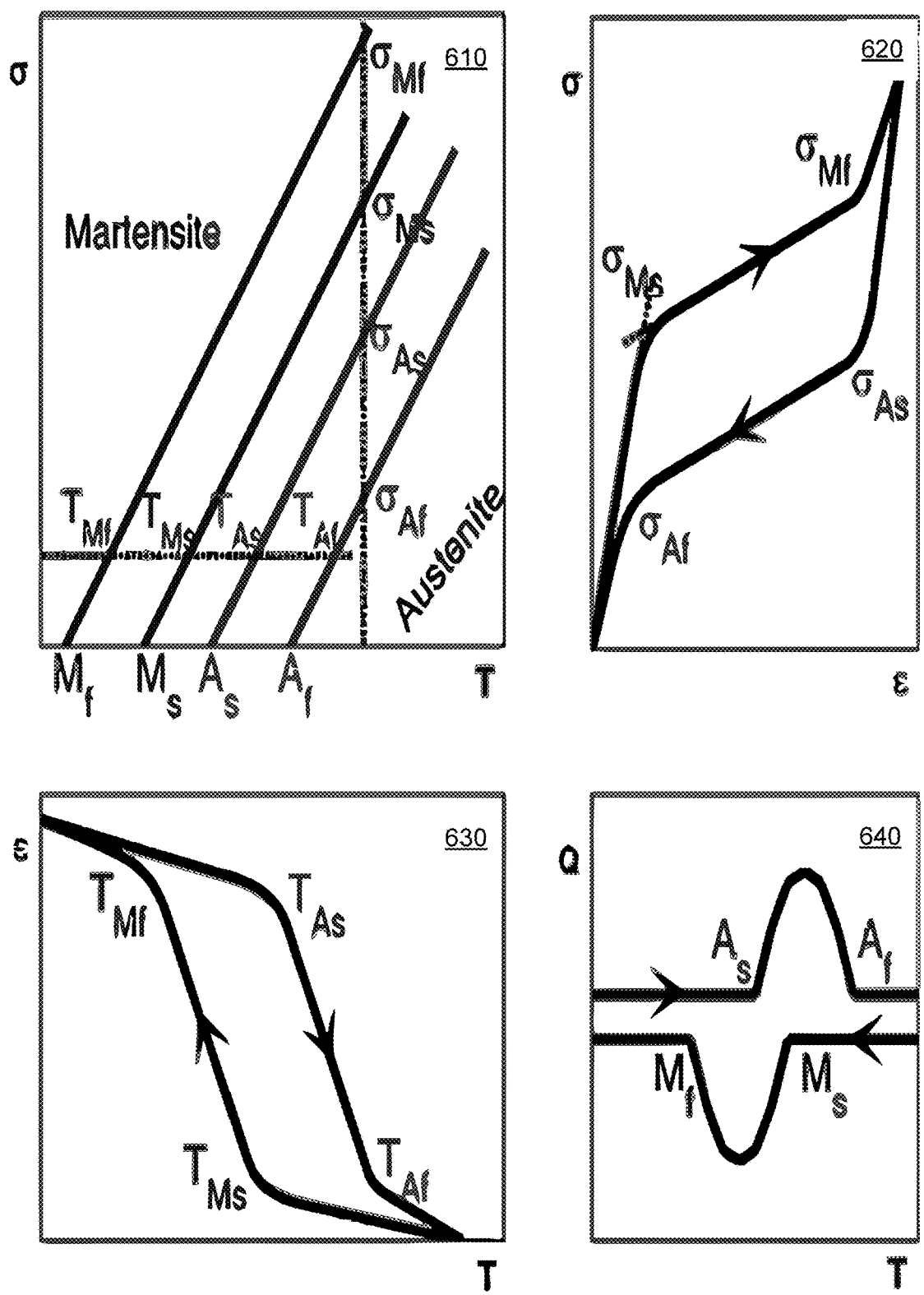
FIG. 6 illustrates examples of plots of shape-memory material.

FIG. 6 shows example plots 610, 620, 630 and 640. The plot 610 shows the stress-temperature phase diagram for austenite and martensite, the plot 620 shows the isothermal superelastic stress-strain curve with transformation stresses defined on the curve, the plot 630 shows isostress strain-temperature curve from mechanically constrained thermal cycling with stress-dependent transformation temperatures defined on the curve and the plot 640 shows heat absorption and release during heating and cooling, respectively, per DSC scanning where the initiation and conclusion of each peak defines a transformation temperature.

FIG. 7 shows a table of various alloys and structure change or crystal structure of martensite phase. As an example, a material can include one or more of such alloys.

As an example, a shape-memory alloy can be super-elastic (see, e.g., the plot 620 as to the stress-strain curve), exhibiting a reversible austenite to martensite (crystallographic) transformation on heating then cooling or additionally or alternatively with the assist of stress(es). As an example, one or more reactive fillers providing "intelligence" to structure can be utilized where such composite materials can be utilized in one or more components, assemblies, etc. For example, equipment described with respect to the FIGS. 1, 2, 3 and 4, and/or other equipment suitable for oilfield (e.g., oil and/or gas) operations may include a super-elastic material.

Figure 8:
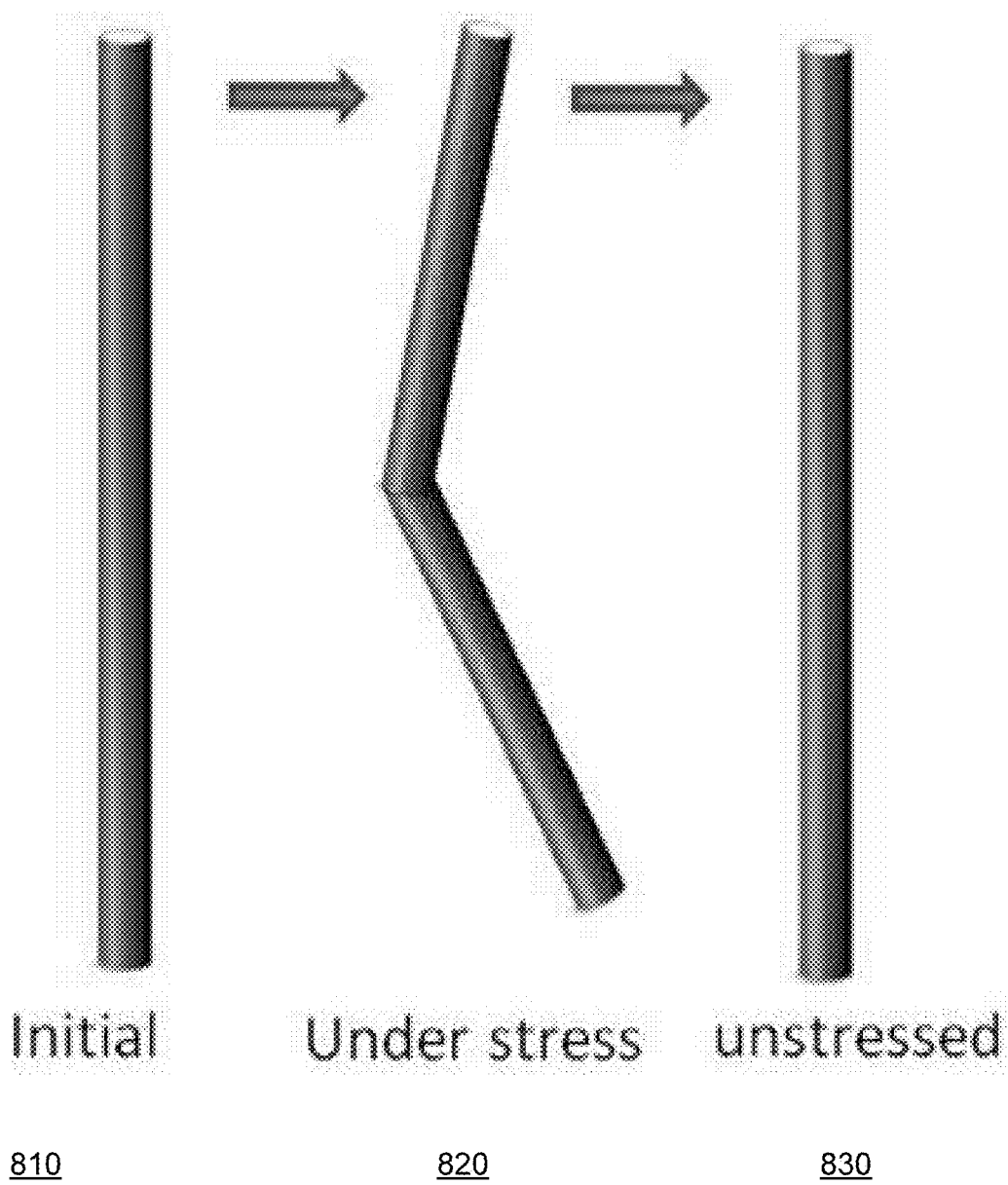
FIG. 8 illustrates an example of a material in example states.

FIG. 8 shows a schematic of a spring back effect of a super-elastic material, which may be part of a component, an assembly, etc. As shown in FIG. 8, in an initial state 810, the component may be of a particular shape that can transition to another shape in an under stress state 820 and that can then transition back to the particular shape in an unstressed state 830. As an example, such a process may be a cycle and a component may be subject to one or more cycles.

Figure 9:
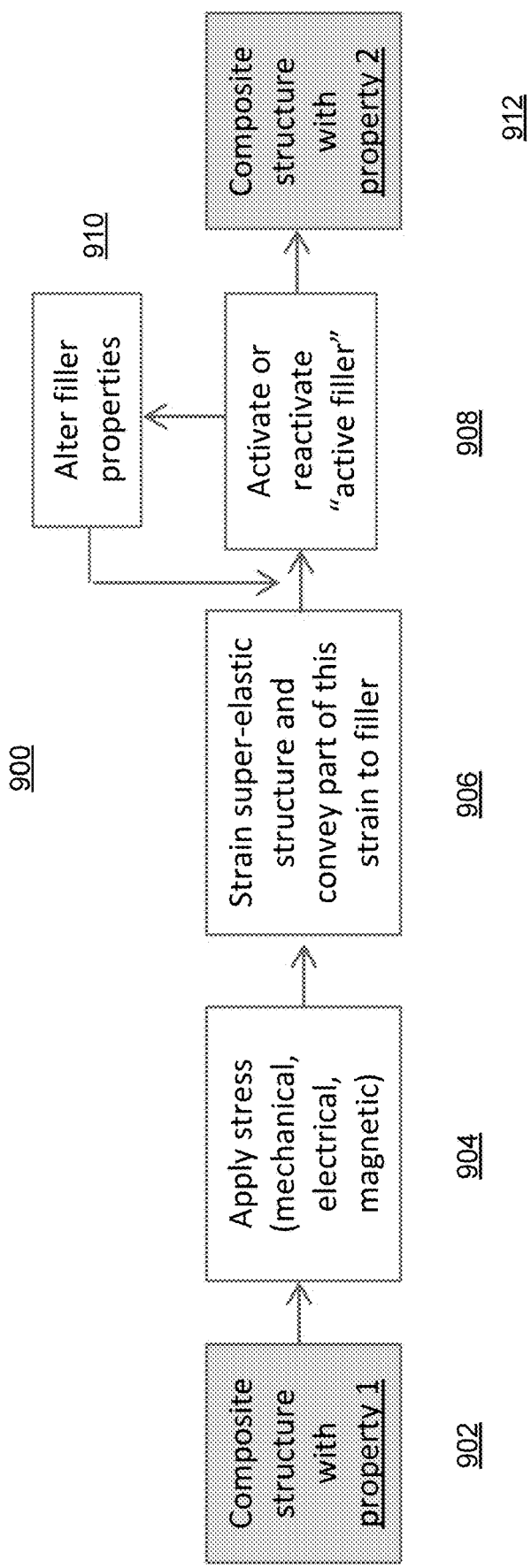
FIG. 9 illustrates an example of a method.

FIG. 9 shows an example of a method 900 where a provision block 902 provides a composite structure with a first property, an application block 904 applies stress (e.g., one or more of mechanical, electrical and magnetic), a stain block 906 strains a super-elastic structure of the composite structure and conveys at least part of the strain to a filler of the composite structure, an activation block 908 activates or reactivates an "active" filler, an optionally alteration block 910 alters one or more filler properties (e.g., optionally of one or more fillers) and a generation block 912 generates the composition structure with a second property. As an example, the first property can be a first property value and the second property can be a second property value for a common property such as, for example, a mechanical property (e.g., a modulus, etc.).

Figure 10:
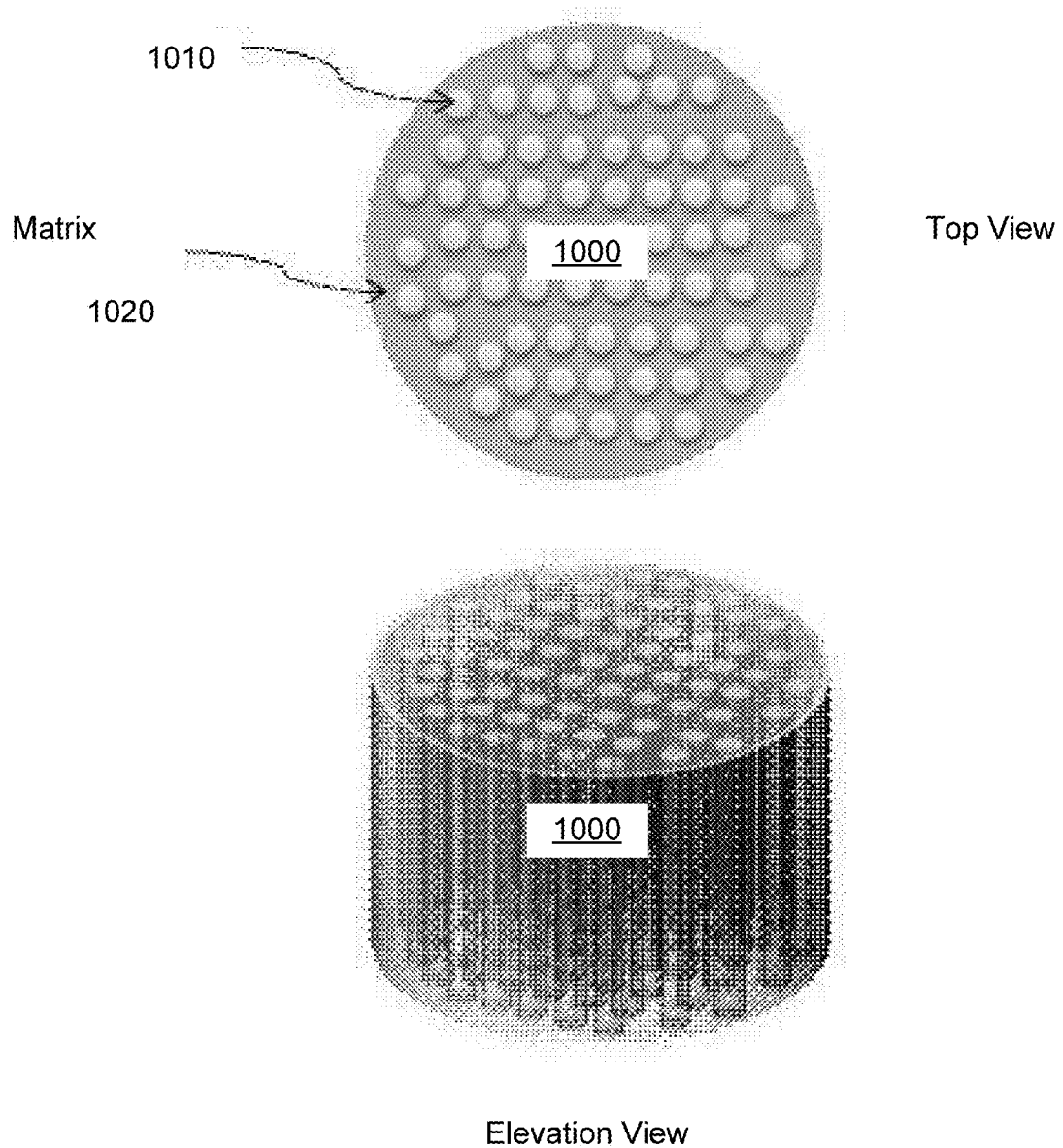
FIG. 10 illustrates an example of a composite structure.

FIG. 10 shows a top view and a semi-transparent elevation view of an example of a composite material 1000 that includes super-elastic material 1010 in a matrix 1020, which can include one or more fillers (e.g., filler material or materials). As an example, a super-elastic composite material can include aligned and parallel pillars, rods and/or wires. Such features (e.g., pillars, rods and/or wires) can be straight, curved, wound (e.g., spiral, helical, etc.) and/or of one or more other shapes. As an example, be aligned in order to maximize flexing in a given direction.

Figure 11:
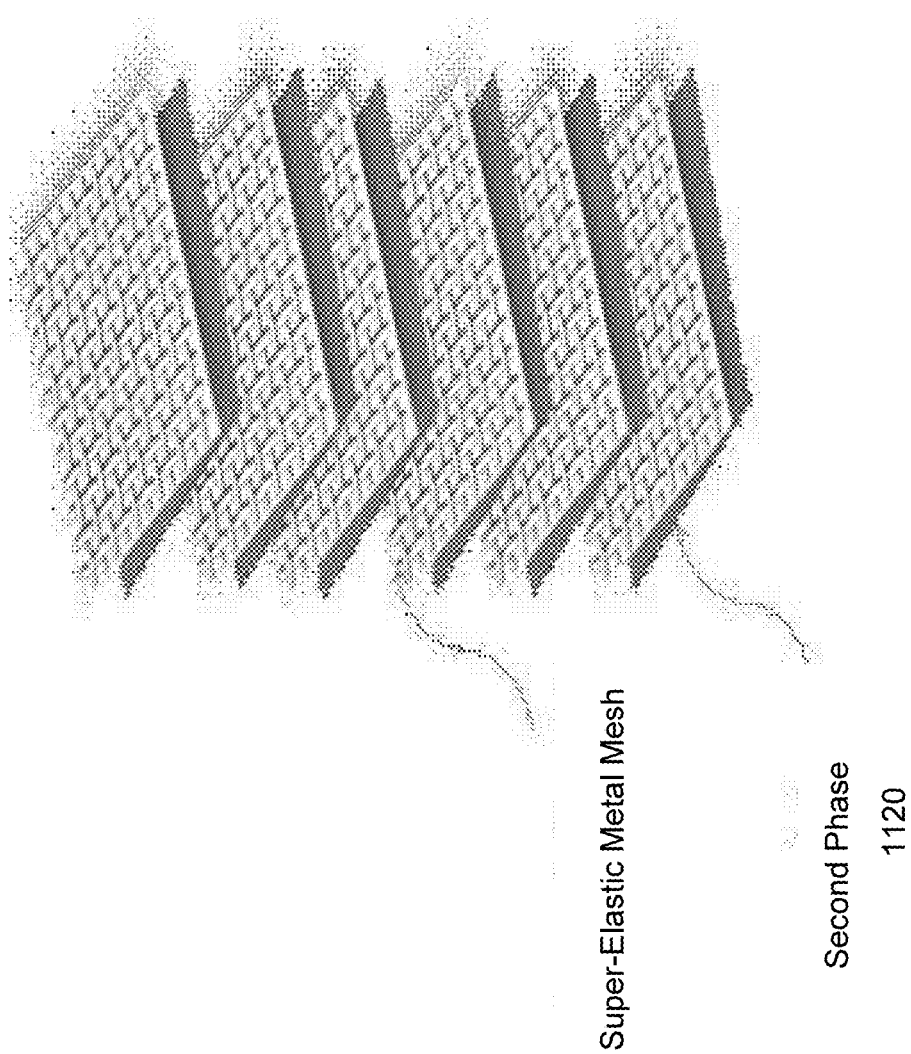
FIG. 11 illustrates an example of a composite structure.

FIG. 11 shows an example of a composite structure 1100 that includes layers of super-elastic metal mesh 1110 that can transition to a second phase 1120, which can be of a different shape and optionally of one or more different properties (e.g., property values) than the super-elastic metal mesh 1110 as in a first phase. In such an example, the mesh 1110 can be a woven mesh of super-elastic metal for a multilayer composite structure.

Figure 12:
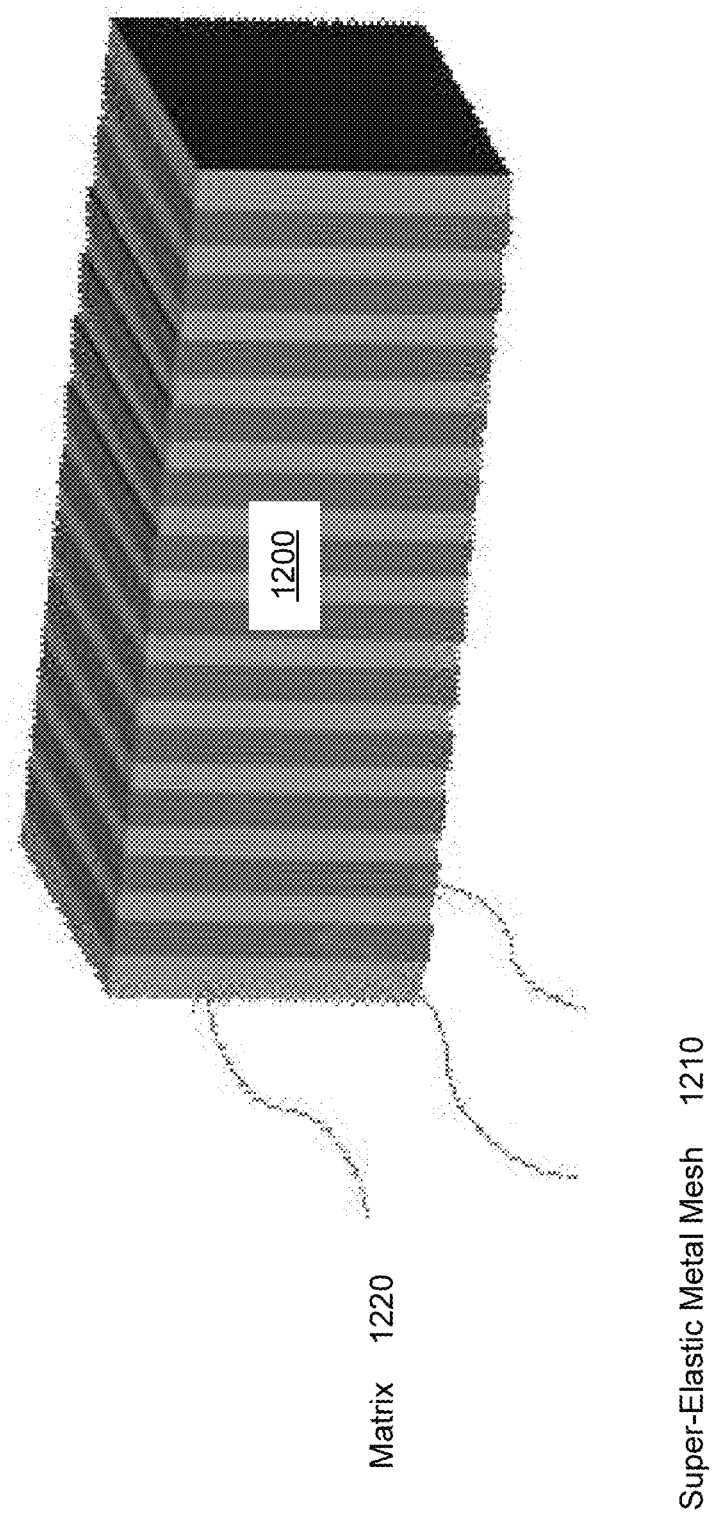
FIG. 12 illustrates an example of a composite structure.

FIG. 12 shows an example of a composite structure 1200 that includes layers of super-elastic metal mesh 1210 and matrix layers 1220.

Figure 13:
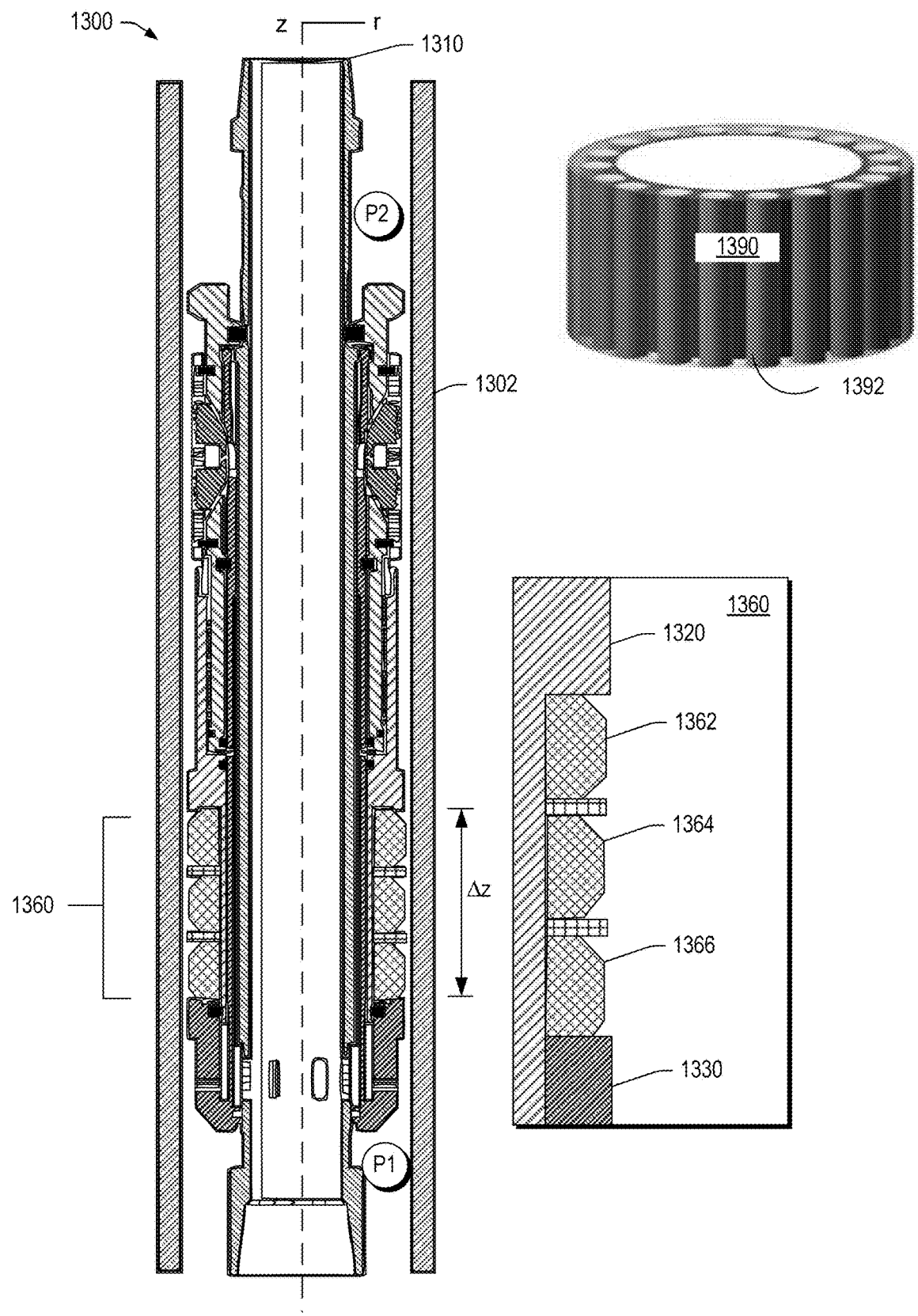
FIG. 13 illustrates an example of an assembly and an example of a composite structure.

FIG. 13 shows an example of a system 1300 that includes a casing 1302 (e.g., a tube or tubular) and equipment 1310 disposed at least in part in a bore of the casing 1302. As shown, the equipment 1310 includes components 1320 and 1330 that define axial limits (e.g., axial stop surfaces) between which exist a packer 1360 that can include portions such as portions 1362, 1364 and 1366. As an example, one or more of the components 1320 and 1330 can move axially to apply force to the packer 1360. In such an example, the packer 1360 may expand at least in part radially such that the packer 1360 contacts an inner surface of the casing 1302. In such an example, as indicated by pressures P1 and P2, a pressure differential may be developed where the packer 1360 forms a seal between, for example, the component 1320 and the inner surface of the casing 1302.

With reference to the portions 1362, 1364 and 1366 of the packer 1360, these may be made of one or more materials, optionally as individual structures or a series of linked structures. As an example, a structure can be formed as the structure 1390 as including one or more elements 1392 that can be or include super-elastic material to form a structure 1390.

As an example, one or more elastomeric materials may be selected at least in part based on friction coefficient. As an example, one or more elastomeric materials may be bonded with one or more components, which can include, for example, one or more metal, alloy, ceramic and/or hard plastic materials.

As an example, a packer may be utilized to seal a tool or tubing with respect to another tool or tubing. As an example, a packer shaped as a ring or other annular shape may include an outer diameter that is in a range of about 5 cm to about 50 cm. As an example, a packer can be shaped as a ring or other type of annular shape may include an inner diameter that is sized to fit about an outer surface of a tool or tubing. As an example, an inner diameter may be in a range of about 0.5 cm to about 49.5 cm.

In the example of FIG. 13, an arrangement of super-elastic elements 1392, which can be reactive, may be in a substantially annular or cylindrical arrangement where the super-elastic elements 1392 (e.g., pillars, rods and/or wires) can be part of a reinforced composite to achieve annular seal. As an example, such a seal may be pressure generated and/or temperature generated. As an example, such a seal may be releasable and/or re-sealable. For example, such a seal may be operated in one or more cycles. As an example, such a seal may be adaptable, for example, adaptable to pressure and/or temperature. As an example, a seal may strengthen in response to pressure and/or temperature and/or weaken in response to pressure and/or temperature.

As an example, a composite structure can include super-elastic, continuous, parallel and aligned elements (e.g., pillars, rods, wires, etc.) that may include single grains or crystallographically aligned grains within their cross-section. Such a structure can have an overall super-elastic behavior and be imbedded within a readily deformable and reactive matrix self-responding to flexing of reinforcing elements so that when mechanically loaded in a bending mode deflects and when being unloaded reversibly springs back (e.g., thereby making possible the rubber-like flexing of a high-strength large diameter material section).

As an example, a composite structure can include intersecting elements that may be stacked or weaved to create an advanced composite structure (e.g., fabric) for multi-directional loads, which may exhibit a level of reactive response to one of more external stimuli.

As an example, a solid bar may be formed of composite material with enhanced (super-elastic) bendability, which when viewed in cross-section is closed (e.g. round tube, or irregular "potatoid" closed shape) and which upon being radially loaded/stresses super-elastically responds by radial expansion or contractions (and therefore corresponding shortening/lengthening).

As an example, a composite material may be applied to a polymer (e.g., elastomer such as rubber) to be used as reusable/recoverable sealing member such as oil and gas packer (see, e.g., the example assembly 1300 of FIG. 13).

As an example, a composite structure can be utilized to reduce effects of vibrations, for example, via shock damping (e.g., responding to stress, strain, etc.).

As an example, a composite structure can include super-elastic elements as one or more of:
  Nickel alloys: Ni—Ti, Ni—Ti—Nb, Ni—Ti—Cu
  Ferrous alloys: Fe—Ni—C, Fe—Pd
  Copper alloys: Cu—Zn—Al, Cu—Al—Ni, Cu—Al—Mn, Cu—Al—Be, Cu—Zn—Sn, Cu—Al—Ni—Be As an example, a composite structure can include a binder material, which may be a filler or fillers that can form a matrix (e.g., for "binding" reinforcing elements and optionally to create a seal around them).

As an example, a binder material or filler can be one or more of the following materials:
  A polymer such as an elastomers, including, thermoplastic elastomer (TPE), Thermoplastic Vulcanizates (TPV), EPM (ethylene propylene rubber), EPDM (Ethylene Propylene Diene Monomer rubber), Polyacrylic Rubber, Silicone rubber, NBR (acrylonitrile butadiene rubber), HNBR (hydrogenated-acrylonitrile butadiene rubber), Fluorosilicone Rubber (FVMQ), Fluoroelastomer (FKM and FEPM)—Viton Technoflon, Fluorel, Aflas and Dai-EL, Perfluoroelastoemrs (FFKM)—Tecnoflon PFR, Kalrez, Chemraz, Perlast.
  A polymer such as thermoplastic (e.g., Polyolefin, Nylon, PPS, PEEK), crosslinkable thermoset (e.g., Epoxy, Phenolic resin, Cyanate ester)
  A metal characterized as having high ductility, and comprising metals and alloys of the following: stainless steel, copper, brass, tin, and characterized by an elongation in excess to approximately 15% and YS/UTS less than approximately 0.8

As an example, when used as binder, a soft metal may act to reduce spring-back, however, when kept thin enough and in minor proportion can be expected to yield back with limited work-hardening, and therefore enable a number of loading cycle, before eventually failing by fatigue.

As an example, a component and/or an assembly that includes one or more composite structures and one or more of a third component:
  Self-healing chemicals (e.g., over-flexing breaks, release a chemical, fill and glue cracks or fixes leakage paths; optionally for filler with limited ductility);
  Piezo-particles (e.g., generate small currents within an electrically sensitive filler, itself for instance changing a polymer stiffness due to Coulombic charges, or charges like a capacitance as needed by application);
  Thermal-active shape memory polymers (e.g., flexing induces internal friction and/or Joule heating by internal current which itself triggers shape-changes);
  pH-active shape-memory polymers (e.g., in the presence of water for instance; e.g. hydrogels, the polymer controls its swelling and therefore provide reactive sealing in between super-elastic rods);
  Electro-active shape memory polymers (e.g., electro-activate shape memory polymer-carbon nanotubes, short carbon fiber, carbon black, metallic Ni power); and
  Ferromagnetic particles (e.g., responding to an external magnetic field) to enable electromagnetic actuation.

As an example, an element or elements may be manufactured as one or more of:
  The simultaneous draw of pillars from a liquid melt as in single or crytallographically-oriented grain growth process such as a Bridgeman process); or
  The additive manufacturing of pillars via laser, electron beam, and/or other deposition processes; and
  Preceded or succeeded, and repeated as desired using metal-working processes such as drawing, pilgering, extrusion, among others.

As an example, a 2D and/or a 3D printer may be utilized to construct one or more composite materials that include a reactive shape-memory allow and, for example, a polymer or polymers. For example, material may be supplied via a powder, a fiber, etc. and deposited in a manner to construct a tool or a portion of a tool.

Figure 14:
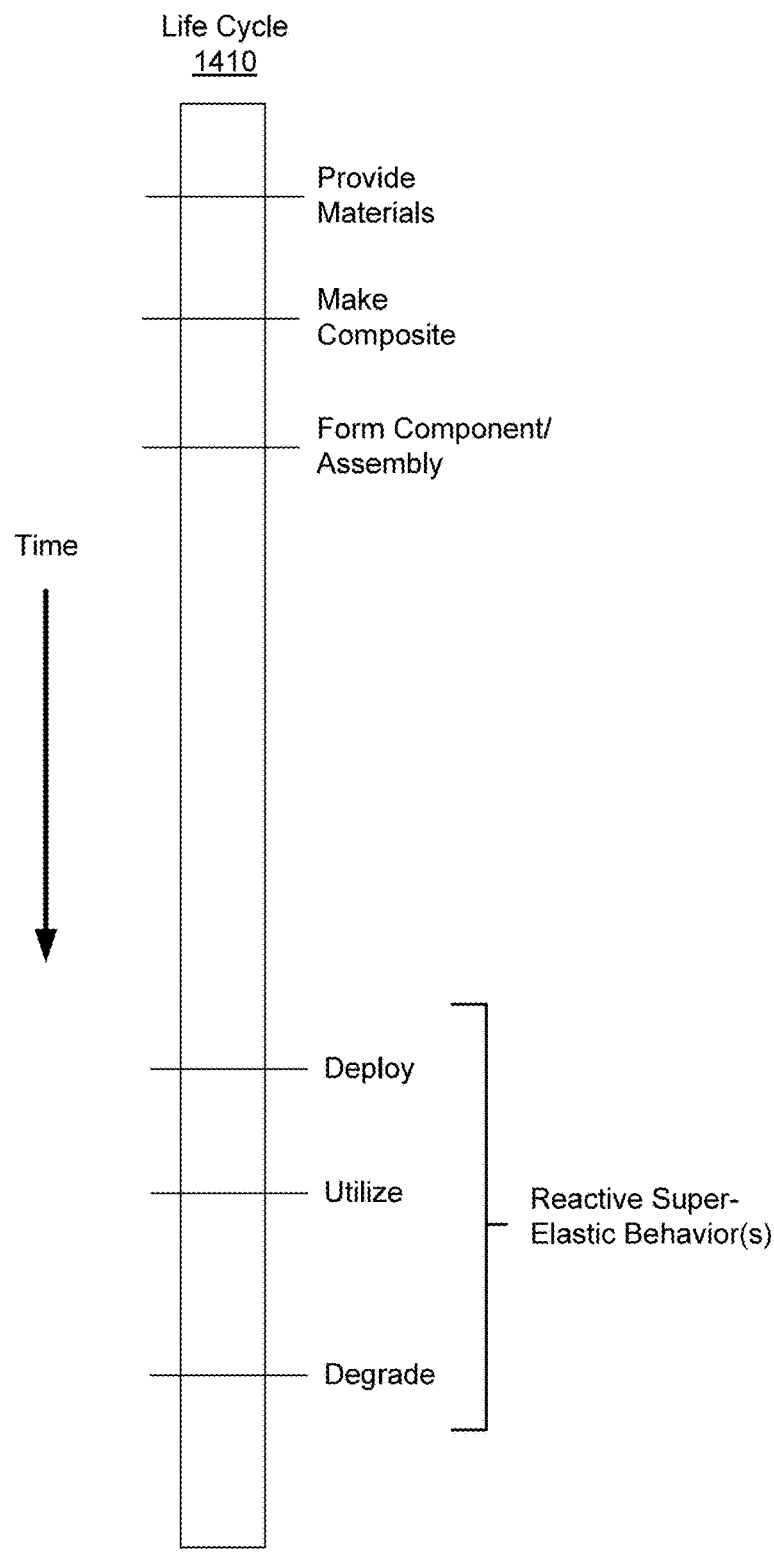
FIG. 14 illustrates an example of a life cycle.

As an example, binder (e.g., filler) and a third component can be built/injected in between the super-elastic elements using the following processes:
  Casting, including pressurized casting (for metal binders);
  Molding, including pressurized molding and injection molding (e.g., for polymer binders), compression molding (e.g., for polymer binders), transfer molding (e.g., for polymer binders)
  Additive manufacturing, alone or in combination with other processes; e.g. additive manufacturing and hot pressing/sintering As an example, a composite structure may be utilized in the oil and gas industry for one or more of the following purposes:
  Enhanced spring back: to shut-off a flow (e.g., helicoidal spring with enhanced displacement for sleeve actuation for flow control or a superelastic hinge of a flapper);
  A spring with enhanced displacement to control (e.g., including assist flow) as in a check dart, or gas-lift/chemical injection valve;
  A super-elastic membrane, or closed pocket, for instance to displace fluids (including electromagnetically actuated if containing ferromagnetic components);
  Enhanced springback, for example, to assist flow (Optilift bag);
  A tubular component, located near a bit, for enhanced bendability (steering) to reduce turning angle;
  Shock and vibration absorption near a bit;
  A coupling stock or connector;
  Blades within a packers for enhanced energization of the sealing element against the formation (e.g. wireline packer);

FIG. 14 shows an example of a life cycle 1410. In the life cycle 1410, various times are illustrated as to stages. For example, one or more materials may be provided, a composite may be made of multiple materials, and a component and/or assembly formed via one or more processes. As an example, a finished, component may be deployed, utilized and optionally, at least in part, degraded. As shown in the example of FIG. 14, the component and/or the assembly may exhibit super-elastic behavior(s) during a life cycle, which can optionally include one or more super-elastic cycles.

As an example, an oilfield tool can include a composite structure that includes a reactive shape-memory alloy element disposed at least in part in a filler material. In such an example, the oilfield tool can be utilized in an oilfield where the term oilfield includes gas fields, oil fields, and oil and gas fields. As an example, an oilfield tool can be a downhole tool that can be inserted into a bore in a formation. As an example, an oilfield tool can be an undersea tool that is used in an aqueous environment.

As an example, a tool can include filler material that includes one or more polymers, which may be referred to as polymeric material. As an example, a filler material can include at least one metal, which may be in the form of a metal, an alloy, a salt, etc. A filler material that includes metal may be referred to as a metallic filler material. As an example, a filler material can include at least one ceramic. In such an example, the ceramic can include one or more inorganic materials.

As an example, a tool can include a piezo-electric material. In such an example, the piezo-electric material may be reactive to electricity and/or to mechanical forces (e.g., stress, strain, etc.).

As an example, a tool can include an unstressed state shape and a stressed state shape. In such an example, state transitions may occur responsive to pressure, temperature or pressure and temperature.

As an example, a tool can be one or more of a fracturing plug tool, a packer tool, a gas lift valve tool and a drillstring tool.

As an example, a tool can include an alloy that includes titanium. As an example, such an alloy can be a shape-memory alloy. As an example, a tool can include an alloy that includes nickel. As an example, such an alloy can be a shape-memory alloy. As an example, a tool can include an alloy that includes copper. As an example, such an alloy can be a shape-memory alloy.

As an example, a reactive shape-memory alloy element can be of a rod shape, a wire shape, a spring shape or of another shape.

As an example, a tool can include a plurality reactive shape-memory alloy elements. Such elements may be formed into one or more groups, which may be arranged to perform one or more functions. As an example, one group may be reactive in response to pressure while another group may be reactive in response to temperature. As an example, a group of reactive shape-memory alloy elements may be reactive in response to one or more of pressure and temperature. As an example, a reactive shape-memory alloy element may be reactive in response to effects associated with pH, chemical concentration, ionic concentration, osmotic pressure, etc.

As an example, a tool can include an alloy and a polymer, which may be in the form of a composite material. In such an example, the alloy may be a shape-memory alloy. In such an example, the polymer may be an elastomer. As an example, one or more reactive shape-memory alloy elements may be disposed at least in part in a polymer that forms a polymeric matrix. Where such a matrix is elastic, changes in shape of the reactive shape-memory alloy elements may cause the matrix to change shape. As an example, a composite material may be of variable material properties where the properties may depend on one or more of pressure and temperature. As an example, a composite material may deform and in response to deformation change its material properties due at least in part to one or more reactive shape-memory alloy elements being in and/or around the composite material.

As an example, a tool can be a pipe, a pipe connection, a pipe component or other conduit associated component. As an example, a tool can be a portion of a subsea tree, a subsea manifold, etc.

As an example, a tool may be part of a coil tubing string. In the oil and gas industries, coiled tubing can refer to a pipe (e.g., about 25 mm to about 83 mm in diameter) supplied spooled on a reel. Coiled tubing may be suitable for various types of interventions in oil and gas wells, as production tubing in depleted gas wells, etc. As an example, coiled tubing may be employed in an operation akin to a wireline operation. As an example, coiled tubing may be utilized to pump material (e.g., fluid, chemicals, etc.). As an example, a coiled tubing operation may be performed through a drilling derrick on a platform or via self-supporting tower. For coiled tubing operations on sub-sea wells, a Mobile Offshore Drilling Unit (MODU) may be utilized or an intervention vessel. As an example, onshore, coiled tubing may be run via a service rig, a mobile self-contained coiled tubing rig, etc.

As an example, a tool string at the bottom of a length of coiled tubing can be referred to as a bottom hole assembly (BHA), which may include a jetting nozzle (e.g., for jobs involving pumping chemicals or cement through the coil), one or more logging tools, etc. As an example, coil tubing may be utilized in a stimulation operation or a treatment operation.

As an example, a processor may be or include a microprocessor, microcontroller, processor module or subsystem, programmable integrated circuit, programmable gate array, or another control or computing device. As an example, a component and/or an assembly may include one or more circuits, one or more power supplies (e.g., batteries, etc.), one or more power generators (e.g., turbines, piezoelectric devices, etc.), etc.

As an example, a storage medium or media may be located in a machine running machine-readable instructions, or located at a remote site from which machine-readable instructions may be downloaded over a network for execution.

Figure 15:
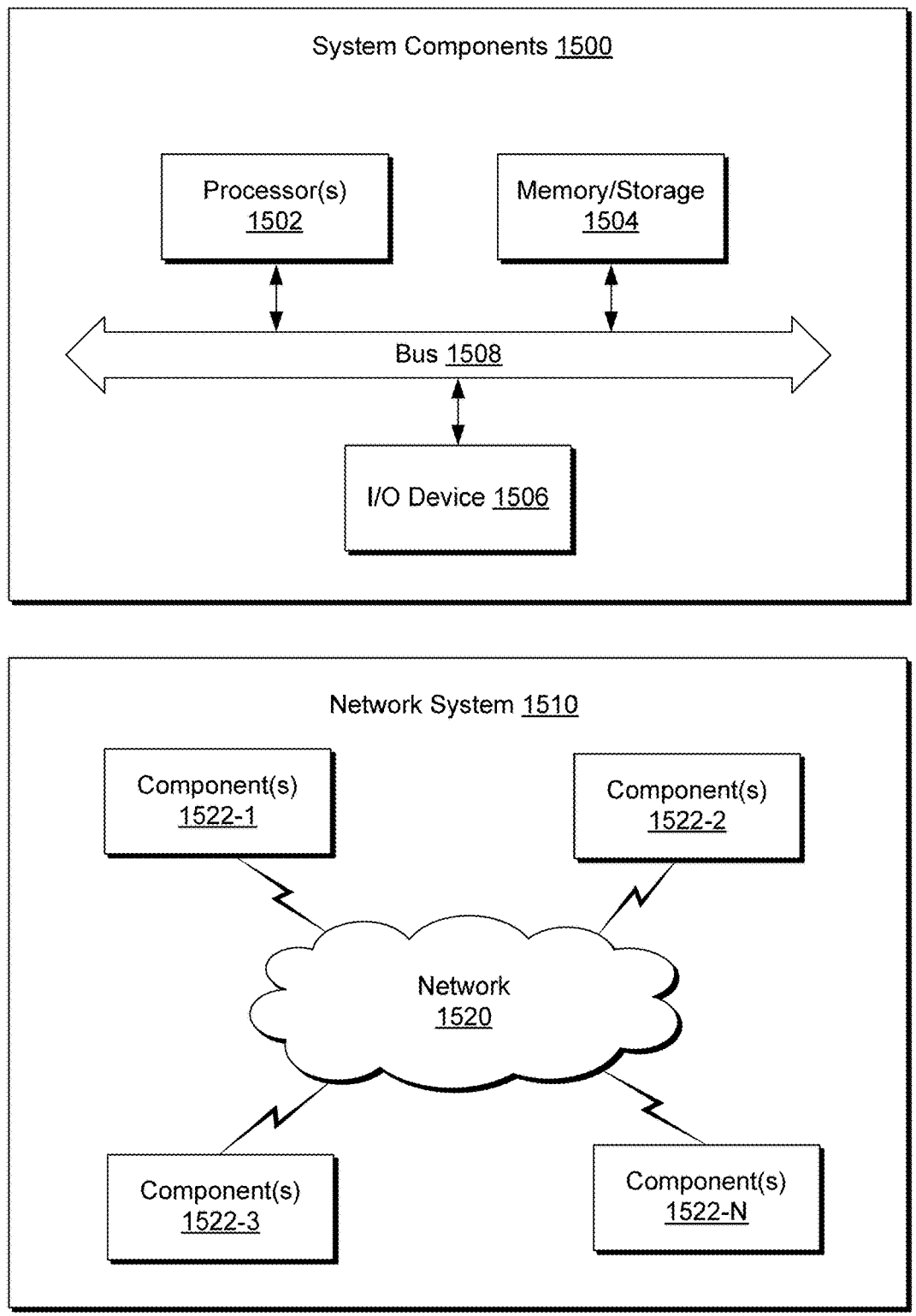
FIG. 15 illustrates example components of a system and a networked system.

FIG. 15 shows components of a computing system 1500 and a networked system 1510. The system 1500 includes one or more processors 1502, memory and/or storage components 1504, one or more input and/or output devices 1506 and a bus 1508. According to an embodiment, instructions may be stored in one or more computer-readable media (e.g., memory/storage components 1504). Such instructions may be read by one or more processors (e.g., the processor(s) 1502) via a communication bus (e.g., the bus 1508), which may be wired or wireless. The one or more processors may execute such instructions to implement (wholly or in part) one or more attributes (e.g., as part of a method). A user may view output from and interact with a process via an I/O device (e.g., the device 1506). According to an embodiment, a computer-readable medium may be a storage component such as a physical memory storage device, for example, a chip, a chip on a package, a memory card, etc.

According to an embodiment, components may be distributed, such as in the network system 1510. The network system 1510 includes components 1522-1, 1522-2, 1522-3, . . . 1522-N. For example, the components 1522-1 may include the processor(s) 1502 while the component(s) 1522-3 may include memory accessible by the processor(s) 1502. Further, the component(s) 1522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. An oilfield tool comprising:
a composite structure comprising: a reactive shape-memory alloy element disposed at least in part in a filler material; and a third component,
wherein the reactive shape-memory alloy element comprises a plurality of features that are aligned and parallel,
wherein the plurality of features of the reactive shape-memory alloy element is at least one selected from the group consisting of: rods; wires; and springs,
wherein the filler material self-responds to flexing of the plurality of features of the reactive shape-memory alloy element by deflecting when mechanically loaded in a bending mode, and reversibly springing back when unloaded,
wherein the filler material and the third component are built or injected in between the plurality of features of the reactive shape-memory alloy element, and
wherein the third component is at least one selected from the group consisting of: self-healing chemicals, piezo-particles, thermal-active shape memory polymers, pH-active shape-memory polymers, electro-active shape memory polymers, and ferromagnetic polymers.

2. The oilfield tool of claim 1 wherein the filler material comprises a polymeric material.

3. The oilfield tool of claim 1 wherein the filler material comprises at least one metal.

4. The oilfield tool of claim 1 wherein the filler material comprises at least one ceramic.

5. The oilfield tool of claim 1 wherein the filler material comprises a piezo-electric material.

6. The oilfield tool of claim 1 comprising an unstressed state shape and a stressed state shape.

7. The oilfield tool of claim 6 wherein state transitions occur responsive to pressure.

8. The oilfield tool of claim 6 wherein state transitions occur responsive to temperature.

9. The oilfield tool of claim 6 wherein state transitions occur responsive to temperature and pressure.

10. The oilfield tool of claim 1 comprising a fracturing plug tool.

11. The oilfield tool of claim 1 comprising a packer tool.

12. The oilfield tool of claim 1 comprising a gas lift valve tool.

13. The oilfield tool of claim 1 comprising a drillstring tool.

14. The oilfield tool of claim 1 wherein the reactive shape memory alloy element comprises titanium.

15. The oilfield tool of claim 1 wherein the reactive shape memory alloy element comprises nickel.

16. The oilfield tool of claim 1 wherein the reactive shape memory alloy element comprises copper.

* * * * *